United States Patent [19]

Pirazzini

[11] Patent Number: 4,759,147
[45] Date of Patent: Jul. 26, 1988

[54] MULTI-LAYER STRUCTURE TO ACCOMPLISH VERY LIGHT-IN-WEIGHT AND TOUGH TUBULAR ELEMENTS PARTICULARLY ADAPTED FOR THE CONSTRUCTION OF FISHING RODS

[75] Inventor: Luca Pirazzini, Bologna, Italy

[73] Assignee: Reglass S.p.A., Bologna, Italy

[21] Appl. No.: 937,551

[22] Filed: Dec. 3, 1986

[30] Foreign Application Priority Data

Dec. 3, 1985 [IT] Italy ................................. 3630 A/85

[51] Int. Cl.⁴ ...................... B32B 5/12; A01K 87/00
[52] U.S. Cl. .................................... 43/18.5; 428/107; 428/112; 428/113; 428/902
[58] Field of Search ............... 428/113, 112, 107, 105, 428/114, 36, 902, 295; 43/18.1, 18.5

[56] References Cited

U.S. PATENT DOCUMENTS 4,621,980 11/1986 Reavely et al. ................. 428/113 X

FOREIGN PATENT DOCUMENTS 165428 10/1982 Japan .................................. 428/113

Primary Examiner—Alexander S. Thomas
Attorney, Agent, or Firm—Thomas R. Vigil

[57] ABSTRACT

The multi-layer structure enables the accomplishment of very light-in-weight and squashing-resistant tubular elements, in particular fishing rods, as it consists of a plurality of layers made of very thin carbon fibers (1) having a high or very high modulus of elasticity, disposed parallel to and alongside each other and impregnated with a matrix resin, said layers being alternated by further layers of very thin aramide fibers (2) disposed parallel to and alongside each other and impregnated with a matrix resin. Carbon fibers and aramide fibers are inclined with respect to each other.

5 Claims, 2 Drawing Sheets

MULTI-LAYER STRUCTURE TO ACCOMPLISH VERY LIGHT-IN-WEIGHT AND TOUGH TUBULAR ELEMENTS PARTICULARLY ADAPTED FOR THE CONSTRUCTION OF FISHING RODS

BACKGROUND OF THE INVENTION

The invention pertains to a multi-layer structure to accomplish very light-in-weight and tough tubular elements particularly adapted for the construction of fishing rods.

DESCRIPTION OF THE PRIOR ART

In the early structural applications of composite materials, layers of stiffening fiber cotton wool (usually of fiber glass) were used over which the resin constituting the embodying matrix or the support allowing the fiber to increase its toughness features was spread with a brush or by spray.

The resulting structure was surely low in price but rather rough, had high and uneven thicknesses and the resistance thereof was relatively reduced.

This method is still used as far as some structures are concerned, but the increase in applications and the appearance of new high-quality fibers has suggested the necessity for a more refined construction technique.

So these fibers have begun to be woven in order to obtain a very high-resistant "fabric" having an even thickness and adapted to be also used for small-sized pieces, thin plates and tubes.

New resins have subsequently appeared along with new stiffening processes using several types of fibers in the same fabric. Carbon and boron fibers, aramide fibers and yet further fibers have been brought into use which had still higher characteristics of lightness, elasticity and stiffness.

Now, although fabric is convenient in use and has been improved in the course of time, it still has some drawbacks.

First of all the fiber resistance and the modulus of elasticity decrease when fibers undergo direction changes and the bigger the angle formed by the stress direction relative to the fiber direction is, the more said fiber resistance decreases.

If we look at a fabric section through a microscope (see FIG. 3 for example), we can notice that a fiber is obliged to change its direction hundreds of times and that the previously mentioned angle becomes bigger as the diameter of the fibers to step over increases and as the said fibers are disposed more closely to each other.

A partial solution to this problem (see FIG. 4) consists in reducing the diameter of the fibers constituting the fabric and in assembling them so that changes may be lower in number.

However this problem is rather hard to solve when only carbon fibers, which are very light in weight, are used. In fact they have a very high resistance in an axial direction but said resistance drastically decreases as the tension direction is even slightly inclined as compared to the axial one.

A further problem is given by the fact that a fabric, owing to the number of complicated spaces which are produced among fibers, is not perfectly "wetted" by the resin everywhere. As a result discontinuities are created in the matrix which give rise to such tension concentrations that a breakage may even occur.

Therefore a complete reliability cannot be ensured, unless the structure is oversized which gives rise to an increase in weight and to a waste of material.

OBJECT AND SUMMARY OF THE INVENTION

The object of the present invention is therefore to eliminate the above mentioned drawbacks.

The invention as defined in the claims solves the problem of providing a structure arranged so that a greater resistance can be achieved without modifying the weight thereof.

An advantage of the present invention resides in the evenness of the structure thus obtained which allows a better contact with the matrix resin and consequently a drastic reduction of the tension concentration points. Said evenness is achieved by superimposing layers of mono-directional carbon fibers disposed alongside each other on layers of monodirectional aramide fibers disposed alongside each other and inclined to the carbon fibers.

This arrangement allows the best exploitation of the resistance features in the different types of fibers and, as a result, a greater resistance is accomplished. In fact carbon fibers have a very high resistance only in an axial direction, whereas aramide fibers are mostly high-resistant to squashing.

BRIEF DESCRIPTION OF THE DRAWINGS

The invention is explained in more detail hereinafter with reference to the accompanying drawings showing an embodiment thereof given by way of non-limiting example only.

DESCRIPTION OF THE PREFERRED EMBODIMENT

The multi-layer structure of the invention (see FIG. 1) consists of a plurality of layers of monodirectional carbon fibers 1 disposed alongside each other and impregnated with a matrix resin alternated by layers of monodirectional aramide fibers 2 disposed alongside each other and impregnated with a matrix resin too.

Preferably the aramide fiber used is that known under the name Kevlar aramide fiber registered trademark of DuPont Corporation.

Both carbon fibers 1 and Kevlar aramide fiber fibers 2 have diameters in the range of a few thousandths of a millimeter so as to obtain very thin and light-in-weight layers.

As already said, carbon fibers 1 of each layer are parallel to each other and, due to resistance requirements, are also parallel to the fibers of the other layers. Kevlar fibers 2, instead, are parallel to each other within the sphere of the same layer but inclined with respect to the fibers 1 of carbon layers. Furthermore, depending upon the different uses, Kevlar aramide fiber fibers 2 belonging to different layers may be inclined to each other.

Between two carbon fiber 1 layers in succession it is possible to provide one or more Kevlar aramide fiber fiber 2 layers optionally inclined with respect to each other in order to achieve a given resistance degree to a particular type of stress.

Figure 2:
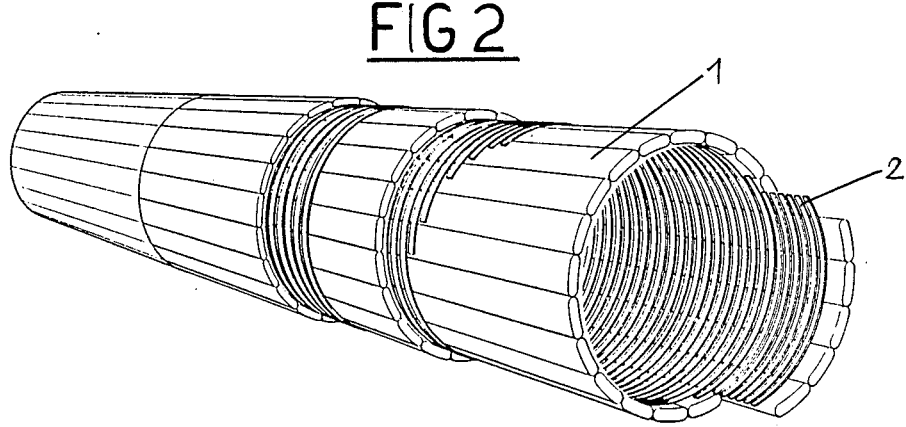
FIG. 2 is a perspective view of one end of a fishing rod made from the structure of the invention where some upper layers have been partly removed in order to best show the underneath ones.
Figure 3:
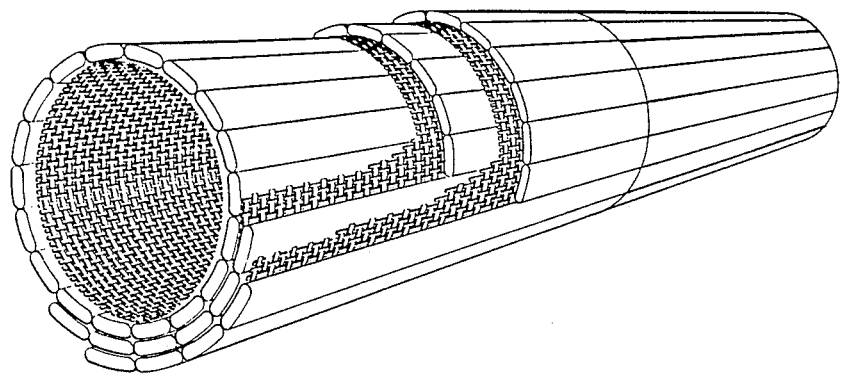
FIGS. 3 and 4 are perspective views of two fishing rods made from known structures.
Figure 4:
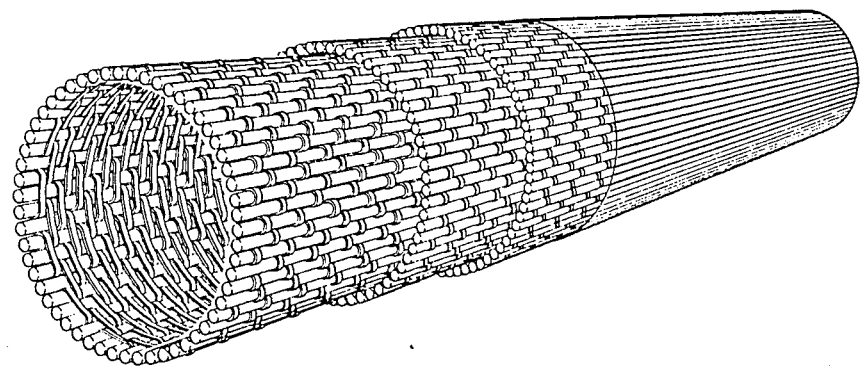

In the case of a fishing rod 3 for example (see FIG. 2) it is preferable to have a single Kevlar aramide fiber fiber 2 layer between two carbon fiber 1 layers in succession. The inclination between carbon fibers 1 and Kevlar aramide fiber fibers 2 in this case is about 90°. As shown in FIG. 2, carbon fibers 1 are disposed longitudinally to the fishing rod 3, whilst Kevlar aramide fiber fibers 2 are disposed transversely to the first ones; in fact carbon fibers 1 must resist to axial tensions whilst Kevlar aramide fiber fibers 2 must mostly bear transverse tensions.

Figure 1:
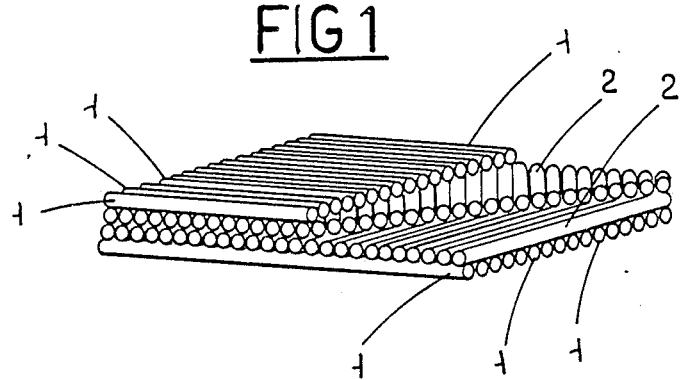
FIG. 1 is a perspective view, on a very enlarged scale as compared to reality, of a length of the multi-layer structure of the invention where some upper layers have been partly removed in order to best show the underneath ones.

Either in the case of FIG. 1 or in the case of FIG. 2 layers are individually made by disposing the different carbon fibers 1 or Kevlar aramide fiber fibers 2 alongside each other, by impregnating them with an uncured matrix resin (not shown in the figures) and by superimposing the different layers so that the fibers may be inclined in the intended manner.

Afterwards the different layers are joined to each other by means of techniques known to those skilled in the art.

Such a structure can be conveniently used for the construction of fishing rods (see FIG. 2) above all when the construction of very light in weight and long fishing rods is involved. In fact in fishing rods the dynamic load to which the same are submitted tends to cause the squashing thereof which in known art fishing rods gives rise to longitudinal cracks, said cracks being on the contrary avoided in fishing rods made from the structure of the present invention, due to the presence of kevlar fibers disposed as hereinbefore specified.

Many modifications and variations may be made to the invention as conceived, all falling within the inventive idea. Furthermore all of the details can be replaced by technically equivalent elements.

What is claimed is:

1. A fishing rod multi-layer composite, the fishing rod being generally cylindrical and having a longitudinal axis, said composite comprising:
   an outer layer of graphite fibers, said graphite fibers being oriented parallel to the longitudinal axis of the fishing rod;
   a first alternate layer of aramide fibers, disposed inwardly adjacent to said first outer layer, said aramide fibers being orientated nearly perpendicularly to said graphite fibers;
   a first inner layer of graphite fibers oriented parallel to the longitudinal axis of the fishing rod disposed inwardly adjacent to said first alternate layer; and
   a matrix resin impregnating all layers so that an integral composite is formed from said layers and said matrix.

2. A multi-layer composite as claimed in claim 1, wherein the aramide fibers of one alternate layer are inclined relative to the aramide fibers of another alternate layer but remain generally perpendicular to the graphite fibers of said first outer layer.

3. The multi-layer composite as claimed in claim 1 wherein said carbon fibers are carbon fibers having a high modulus of elasticity.

4. The composite of claim 1 further comprising:
   a numbered, alternate layer of aramide fibers, said aramide fibers being orientated nearly perpendicularly to said graphite fibers, the number of said numbered alternate layer being greater than one, disposed inwardly adjacent to a numbered inner layer, the number of said numbered inner layer being one less than the number of said numbered alternate layer.

5. The composite of claim 4 further including:
   a numbered inner layer of graphite, said aramide fibers being orientated nearly perpendicularly to said graphite fibers, the number of said numbered inner layer being greater than one and equal to the number of said numbered alternate layer, disposed inwardly adjacent to said numbered alternate layer.

* * * * *